W. C. MARSH.
VALVE.
APPLICATION FILED FEB. 26, 1915.

1,165,197.

Patented Dec. 21, 1915.

Witnesses
Edwin L. Yewell
Sallie B. Boland

Inventor
William C. Marsh
By Percy B. Hills
Attorney

UNITED STATES PATENT OFFICE.

WILLIAM C. MARSH, OF DUNKIRK, NEW YORK, ASSIGNOR TO MARSH VALVE COMPANY, OF DUNKIRK, NEW YORK, A CORPORATION OF NEW YORK.

VALVE.

1,165,197.  Specification of Letters Patent.  Patented Dec. 21, 1915.

Application filed February 26, 1915. Serial No. 10,708.

*To all whom it may concern:*

Be it known that I, WILLIAM C. MARSH, a citizen of the United States, residing at Dunkirk, in the county of Chautauqua and State of New York, have invented certain new and useful Improvements in Valves, of which the following is a specification.

Figure 1:
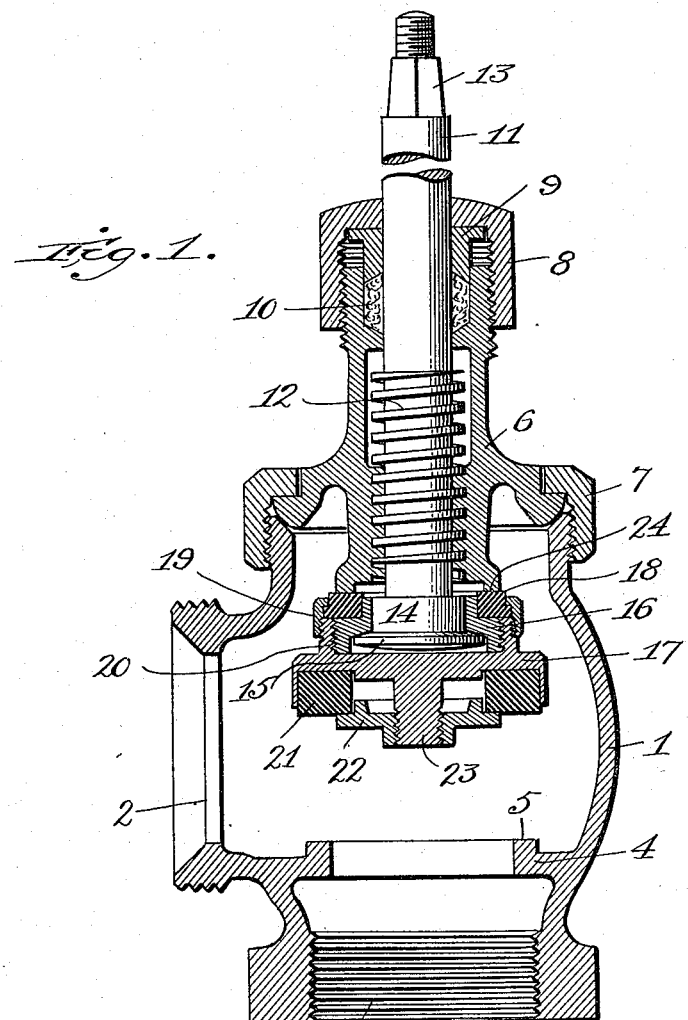
Figure 2:
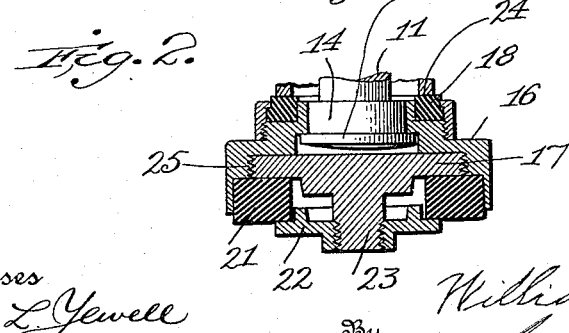

My invention relates to valves, more particularly of that type wherein there is a seal against leakage around the valve stem, provided by forming the valve with an upper valve seat adapted to be closed when the valve proper is open, and has for its object to provide certain improvements in the construction of the same as more definitely will be pointed out and claimed hereinafter, reference being had to the accompanying drawing, in which:

Figure 1 is a vertical sectional central view of my improved valve. Fig. 2 is a detail view of the disk holder and its parts, illustrating a slightly modified construction.

In the said drawing, the reference numeral 1 denotes the casing or body of the valve having suitable threaded inlet and outlet openings 2, 3, and an integral partition 4 forming a valve seat 5. The upper portion of the body 1 receives a bonnet piece 6 held in engagement therewith by means of a ring 7, and said bonnet piece also is provided with a packing nut 8 at its upper end adapted to act on a follower 9 to compress a packing 10.

Passing centrally through the packing nut 8, follower 9, packing 10 and bonnet piece 6 is a valve stem 11, provided intermediate its length with a screw thread 12 in threaded engagement with the bonnet piece 6, so that the stem 11 will move up and down in said bonnet piece when rotated by a suitable handle (not shown) applied to the upper squared end 13 thereof. Below said screw thread 12, the stem 11 is enlarged at 14 and at its lower end is formed into an integral collar 15 over which fits a disk holder formed in two parts 16, 17 in screw threaded engagement with each other at 20, the assemblage of said parts around the collar 15 connecting the two together, but permitting a slight rocking motion to the disk holder. The upper member 16 of said disk holder is recessed to receive a suitable packing disk 18, the same being retained in position thereon by a flanged ring 19 in screw threaded engagement with the lower member 17 when said members 16 and 17 are assembled, and said packing ring overlying the screw threaded joint 20 between said members as shown. The lower surface of the member 17 of the disk holder is recessed annularly to receive a packing disk 21, which is retained in position by a washer 22 screwed to a central extension 23 on said member, said packing disk being adapted to engage the valve seat 5 in the partition 4 when the valve disk holder is in its lowermost position.

In operation, a rotation to the right of the stem 11 will, through thread 12, cause a bodily downward movement of the stem 11 and the disk holder, until the packing disk 21 contacts with the valve seat 5, thus closing the valve. In opening, the movement of the stem 11 is reversed, and as the valve is opened the packing disk 18 comes in contact with a seat 24, formed at the lower end of the bonnet piece 6, thus sealing the escape of fluid through the bonnet piece and around the screw-threads 12.

The disk holder being formed of two members 16 and 17 in screw-threaded engagement with each other at 20, thus provide a line of escape for the fluid at said point of engagement and thence past the screw-threads 12. By positioning the packing ring 18 to cover said line of connection 20, and by screwing the ring 19 to position tightly to compress said packing ring upon said line of connection 20, I provide a most efficient seal against the escape of liquid at this point. Furthermore, when the valve is screwed to its upper position with the ring 18 in contact with its seat 24, the pressure so produced further tends to compress said ring upon the joint 20.

In Fig. 2 I have illustrated a slightly modified construction, wherein the screw connection between the two members 16 and 17 of the disk holder instead of being located as at 20 in Fig. 1 is located at the point 25. That is to say, it is so disposed that it is covered by the packing ring 21 instead of the packing ring 18, said packing ring 21 being tightly compressed upon said line of connection 25 by means of the nut or washer 22.

Having thus described my invention, what I claim as new and desire to secure by Letters Patent, is:—

1. A valve embodying a casing, a longitudinally movable valve stem therein, oppositely disposed valve seats in said casing, and a disk holder in said casing formed in two parts and engaging said valve stem and carrying oppositely disposed disks for engaging said valve seats, one of said disks being disposed to cover the line of juncture between the two parts of said disk holder.

2. A valve embodying a casing, a longitudinally movable valve stem therein, oppositely disposed valve seats in said casing, a disk holder in said casing formed in two parts and engaging said valve stem and carrying oppositely disposed disks for engaging said valve seats, one of said disks being disposed to cover the line of juncture between the two parts of said disk holder, and a ring adjustably engaged with said disk holder and adapted to retain and compress said juncture covering disk in position.

3. A valve embodying a casing, a longitudinally movable valve stem therein having a collar at its lower end, oppositely disposed valve seats in said casing, a disk holder in said casing formed in two parts in screw-threaded engagement with each other and embracing said collar and carrying oppositely disposed disks for engaging said valve seats, one of said disks being disposed to cover the line of screw-threaded engagement between the two parts of said disk holder, and a ring in screw-threaded engagement with said disk holder and adapted to retain and compress said juncture covering disk in position.

In testimony whereof I have hereunto set my hand in the presence of two subscribing witnesses.

WILLIAM C. MARSH.

Witnesses:
N. F. GOULD,
B. M. SULLIVAN.

Copies of this patent may be obtained for five cents each, by addressing the "Commissioner of Patents, Washington, D. C."